US010715508B2

(12) United States Patent
Hibshoosh et al.

(10) Patent No.: US 10,715,508 B2
(45) Date of Patent: *Jul. 14, 2020

(54) SERVER-ASSISTED SECURE EXPONENTIATION

(71) Applicant: Cisco Technology, Inc., San Jose, CA (US)

(72) Inventors: Eliphaz Hibshoosh, Tel Aviv (IL); Aviad Kipnis, Efrat (IL)

(73) Assignee: Cisco Technology, Inc., San Jose, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 16/004,860

(22) Filed: Jun. 11, 2018

(65) Prior Publication Data
US 2018/0288023 A1    Oct. 4, 2018

Related U.S. Application Data

(63) Continuation of application No. 14/957,627, filed on Dec. 3, 2015, now abandoned.

(30) Foreign Application Priority Data

May 31, 2015    (IL) .......................................... 239102

(51) Int. Cl.
*H04L 29/06*    (2006.01)
*H04L 9/00*    (2006.01)
*H04L 9/08*    (2006.01)

(52) U.S. Cl.
CPC ............ *H04L 63/061* (2013.01); *H04L 9/008* (2013.01); *H04L 9/0841* (2013.01)

(58) Field of Classification Search
None
See application file for complete search history.

(56) References Cited

U.S. PATENT DOCUMENTS 7,254,586 B2    8/2007    Chen et al.
7,472,093 B2    12/2008    Juels
(Continued)

FOREIGN PATENT DOCUMENTS

WO    WO9808323    2/1998
WO    WO2010100015    9/2010
(Continued)

OTHER PUBLICATIONS

Katz, Jonathan; Threshold Cryptosystems Based on Factoring, In Proceedings of the 8th Int'l Conference on the Theory and Application of Cryptology and Information Security: Advances in Cryptology (ASIACRYPT '02), Springer-Verlag, London, UK, UK, 192-205.

(Continued)

*Primary Examiner* — Kambiz Zand
*Assistant Examiner* — Arezoo Sherkat

(57) ABSTRACT

In one embodiment, a method for secure computation, includes receiving in a server, over a communication channel from a device external to the server a request to perform a modular exponentiation operation in which an exponent of the operation comprises a secret value, wherein the secret value is not provided to the server, and at least two parameters that encode the secret value in accordance with a polynomial or matrix homomorphic encryption of the secret value computed by the device, and performing in the server, in response to the request, a homomorphic exponentiation using the at least two parameters received from the device without decrypting the secret value in the server, so as to generate an output that is indicative of a result of the modular exponentiation operation.

20 Claims, 4 Drawing Sheets

(56) References Cited

U.S. PATENT DOCUMENTS

| | | | |
|---|---|---|---|
| 9,973,334 B2* | 5/2018 | Hibshoosh | H04L 9/008 |
| 2010/0329454 A1 | 12/2010 | Takashima | |
| 2011/0110525 A1 | 5/2011 | Gentry | |
| 2011/0243320 A1 | 10/2011 | Halevi et al. | |
| 2011/0264920 A1 | 10/2011 | Rieffel et al. | |
| 2012/0039473 A1* | 2/2012 | Gentry | H04L 9/008 |
| | | | 380/277 |
| 2015/0188700 A1* | 7/2015 | Ben Saied | H04L 9/0838 |
| | | | 380/44 |
| 2016/0352710 A1 | 12/2016 | Hibshoosh et al. | |

FOREIGN PATENT DOCUMENTS

| | | | | |
|---|---|---|---|---|
| WO | WO-2014016795 A2 * | 1/2014 | | H04L 9/0869 |
| WO | WO2014016795 A2 | 1/2014 | | |

OTHER PUBLICATIONS

Atallah, Mikhail J.; Securely Outsourcing Linear Algebra Computations, In Proceedings of the 5th ACM Symposium on Information, Computer and Communications Security (ASIACCS '10), ACM, New York, NY, USA, 46-59.

Benjamin, David; Private and Cheating-Free Outsourcing of Algebraic Computations, 2008, In Proceedings of the 2008 Sixth Annual Conferences on Privacy, Security and Trust (PST '08). IEEE Computer Society, Washington, DC, USA, 240-245.

Schmidt-Samoa, Katja; Paillier'S Cryptosystem Modulo P2Q and Its Applications To Trapdoor Commitment Schemes, 2005, In Proceedings of the 1st int'l conference on Progress in Cryptology in Malaysia (Mycrypt'05), Springer-Verlag, Berlin, Heidelberg, 296-313.

Rivest, Ronald L.; On Data Banks and Privacy Homomorphisms, Foundations of Secure Computation, 1978.

Gentry, Craig; Implementing Gentry'S Fully-Homomorphic Encryption Scheme, 2011.

Gentry, Craig; Fully Homomorphic Encryption Using Ideal Lattices (2009).

Sharma, Iti; Fully Homomorphic Encryption Scheme With Symmetric Keys, PhD diss., Department of Computer Science & Engineering University College of Engineering, Rajasthan Technical University, Kota, 2013.

Kawamura, S.; Fast Server-Aided Secret Computation Protocols for Modular Exponentiation—IEEE Xplore, vol. 11, No. 5, pp. 778, 784, Jun. 1993 Found at: http://ieeexplore.ieee.org/xpl/freeabs_all.jsp?arnumber=223880&abstractAccess=no&userType=inst.

Kipnis, Aviad; Efficient Methods For Practical Fully Homomorphic Symmetric-Key Encryption, Randomization and Verification, 2012, Cryptology ePrint Archive: Report 2012/637 Found at: http://eprint.iacr.org/2012/637.

Brakerski, Zvika; Efficient Fully Homomorphic Encryption From (Standard) LWE, FOCS. 2011.

Yoneyama, Kazuki; Efficient and Strongly Secure Password-Based Server Aided Key Exchange (2008), In Proceedings of the 9th Int'l Conference on Cryptology in India: Progress in Cryptology (INDOCRYPT '08), Springer-Verlag, Berlin, Heidelberg, 172-184.

* cited by examiner

SERVER-ASSISTED SECURE EXPONENTIATION

CROSS REFERENCE TO RELATED APPLICATIONS

The present application is a continuation of U.S. patent application Ser. No. 14/957,627, filed Dec. 3, 2015, which in turn claims priority to Israel Patent Application No. 239102, filed on May 31, 2015, the entire contents of which are incorporated herein by reference.

TECHNICAL FIELD

The present disclosure relates generally to cryptography, and particularly to systems and methods for execution of computations using secret values by an untrusted computer.

BACKGROUND

Homomorphic encryption is a form of encryption that allows computations to be carried out on ciphertext, thus generating an encrypted result which, when decrypted, matches the result of operations performed on the plaintext. Using homomorphic encryption, for instance, one computer could add two encrypted numbers, and then another computer could decrypt the result, without either of them being able to find the values of the individual numbers.

A variety of homomorphic encryption systems are known in the art. For example, PCT International Publication WO 2014/016795, describes a practical, fully-homomorphic encryption system for specific data in $Z_N$ (wherein $Z_N$ is the ring of residues modulo N, and N is factored by two primes, p and q). The system can be used in fully-homomorphic methods for practical randomization of data (over a commutative ring), as well as symmetric encryption of mod-N data over the ring $Z_N$. It can be used to secure, for example, the multivariate input or the coefficients of a public polynomial function for running in an open, untrusted environment.

The methods disclosed in the above-mentioned PCT publication are said to enable the use of low-cost collaborative security platforms for applications such as keyed-hash or private-key derivation algorithms. Such a platform may comprise a low-cost (and low-performance) security element, supported by an untrusted high-performance server running the homomorphic algorithms. It is shown in the publication that random plaintext data is a sufficient condition for proof of security of the homomorphic encryption.

BRIEF DESCRIPTION OF THE DRAWINGS

The present disclosure will be more fully understood from the following detailed description of the embodiments thereof, taken together with the drawings in which.

DESCRIPTION OF EXAMPLE EMBODIMENTS

Overview

Figure 1:
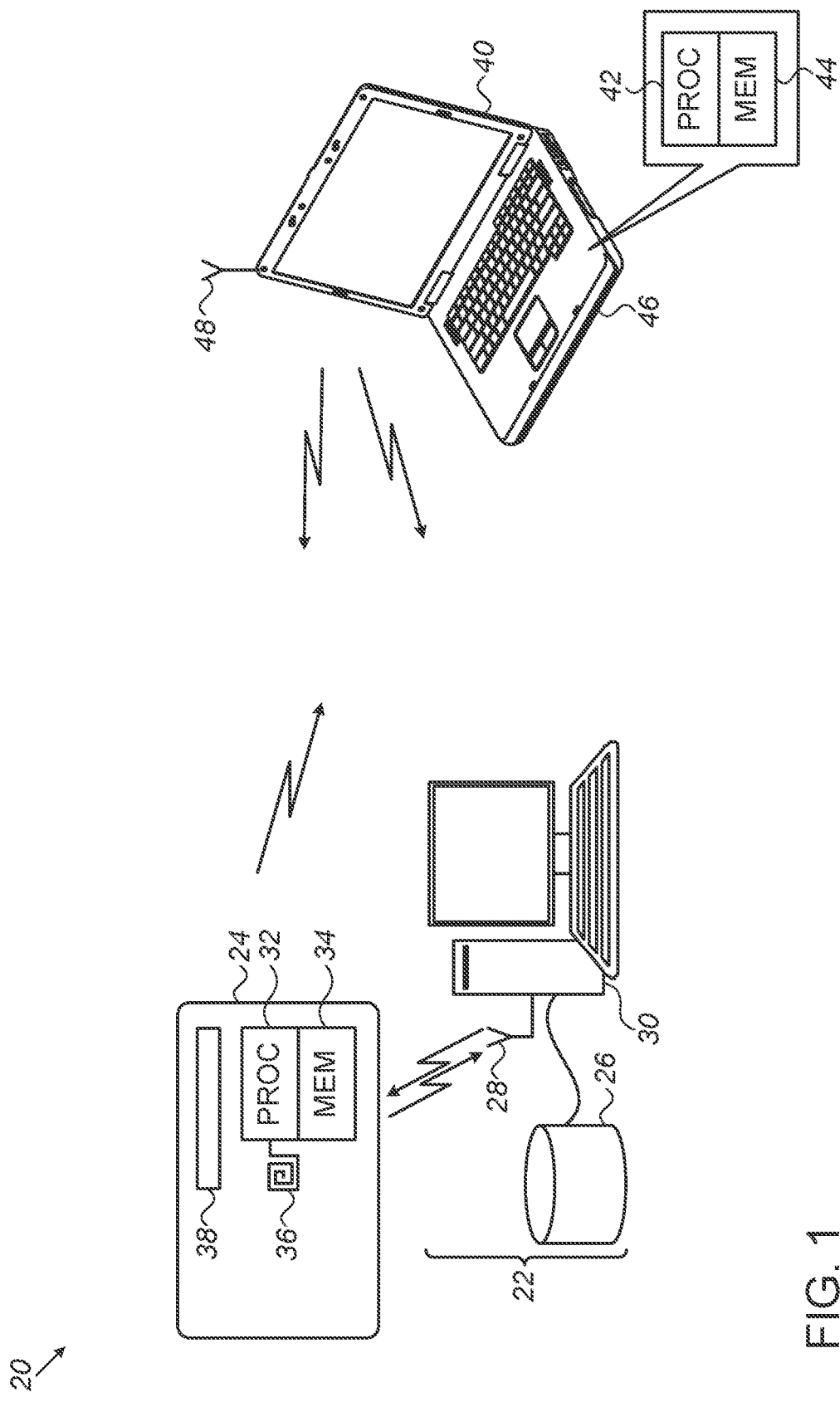
FIG. 1 is a block diagram that schematically illustrates a system for secure computation using homomorphic encryption, in accordance with an embodiment of the present disclosure.

There is therefore provided, in accordance with an embodiment of the disclosure, a method for secure computation, which includes receiving in a server, over a communication channel from a device external to the server, a request to perform a modular exponentiation operation in which an exponent of the operation includes a secret value, which is not provided to the server, and at least two parameters that encode the secret value in accordance with a polynomial homomorphic encryption of the secret value computed by the device. The server performs, in response to the request, a homomorphic exponentiation using the parameters received from the device without decrypting the secret value in the server, so as to generate an output that is indicative of a result of the modular exponentiation operation.

There is also provided, in accordance with an embodiment of the disclosure, a method for secure key exchange between first and second peer devices, which respectively hold first and second secret values, a and b. The method includes computing in the first peer device an encryption of the first secret value a so as to generate encryption parameters that encode the first secret value, and conveying the encryption parameters over a communication channel to a server, which does not have access to either of the first and second secret values a and b. A first base value $g^a$, equal to a public value g raised to a first power equal to the first secret value a, is computed and conveyed to the second peer device, which raises the first base value to a second power equal to the second secret value b in order to generate a session key $g^{ab}$. (The computations are typically performed in modular arithmetic, with a base N=p·q, as is known in the art.) The server receives a second base value $g^b$ computed by the second peer device by raising the public value g to the second power. A homomorphic exponentiation is computed in the server using the encryption parameters and the second base value $g^b$, so as to generate an output $HE(g^{ab})$ that is indicative of the session key. The output is conveyed from the server over the communication channel to the first peer device, which applies a polynomial homomorphic decryption to the output conveyed by the server in order to recover the session key $g^{ab}$. Communications between the first and second peer devices are encrypted and decrypted using the session key.

DETAILED DESCRIPTION

A number of cryptographic protocols that are in common use today involve secure exponentiation, such as raising a value to a large secret power. Such exponentiation, like other cryptographic operations, is typically performed as a modular operation, with a large modulus. Therefore, references to exponentiation and arithmetic operations in the present description and in the claims should generally be understood as referring to modular operations unless otherwise specified. The term "large," as used herein in reference to moduli and other numerical values, means large enough to provide cryptographic security given available computing power. This criterion typically implies values of at least 1000 bits in present terms.

The modular exponentiation required by cryptographic protocols is "secure" in the sense that the secret value used in the computation is not revealed to untrusted parties. Specifically, it is typically practically infeasible to compute the secret value from the result of the modular exponentiation or other public values. To achieve the desired security, in most cases, the computational task is carried out within a secure element, which holds the secret value internally. Such exponentiation, however, requires a large number of multiplications of large numbers. This task is, therefore, computationally challenging for secure elements with limited computing power, such as a low-cost SIM or smart card without a hardware-based crypto-accelerator.

Some embodiments of the present disclosure that are described herein overcome this limitation by means of collaborative computation, in which the secure element delegates the exponentiation task to a computationally powerful but unsecure (and therefore untrusted) server. The term "server" is used in this context to refer broadly to any suitable computer that is external to the secure element and provides the requested computational services, ranging from a process running remotely on a cloud server, to a host CPU with sufficient power on a mobile phone in which a secure SIM is installed, to a powerful application-CPU within a chip that also has a secure execution environment or a secure CPU. When the delegation of the exponentiation task is properly carried out, the secret value itself is not revealed to the server and cannot practically be recovered from the data exchanged between the secure element and the server. At the same time, the computing power of the server is exploited in order to complete the exponentiation operation in far less time than would be required for the secure element to carry out the operation itself, notwithstanding the additional time required for encryption, communication, and decryption of the computational result.

The disclosed embodiments meet these objectives using techniques of homomorphic encryption based on polynomial functions, referred to herein as "polynomial homomorphic encryption." Techniques of this sort are described in greater detail in the above-mentioned PCT publication WO 2014/016795, as well as in the Annex below. These techniques enable the secure element to encrypt and decrypt secret values using only a few arithmetic operations, while defining a homomorphic version of the exponentiation operation that can be applied efficiently to the parameters provided by the encryption. The encryption scheme is provably-secure when applied to plaintext values that have the form of large random numbers. The numbers are "random" in the sense that they are chosen arbitrarily in $Z_N$, and there is no correlation between successive choices, where $Z_N$ is the ring of residues modulo N, and N is factored by two primes, p and q.

On this basis, the embodiments of the present disclosure that are described herein provide methods for secure computation, in which a server (understood broadly, as defined above) receives a request over a communication channel from a device external to the server to perform a modular exponentiation operation. The server in this context is untrusted, while the external device is a secure element, which holds a secret value that is not provided to the server. Any one or more of the exponent, the base, and the result of the requested exponentiation operation may comprise such a secret value. Using polynomial homomorphic encryption, the device computes and provides to the server at least two parameters that encode the secret value. In response to the request, the server performs a homomorphic exponentiation using the parameters received from the device without decrypting the secret value, and thus generates an output that is indicative of the result of the modular exponentiation operation.

In some cases in which the exponent of the requested exponentiation operation is the secret value, while the result of the exponentiation need not be kept secret, the server may use the parameters provided by the secure device in computing and outputting the actual result of the exponentiation operation in plaintext. In other cases, the result that is output by the server comprises a pair of output values, which are then decrypted by the secure device using the appropriate polynomial homomorphic decryption key in order to recover the result of the exponentiation operation.

Typically, the polynomial homomorphic encryption scheme, as described in the above-mentioned PCT publication and in the Annex, uses two secret random large numbers as polynomial roots in encrypting plaintext values, and applies the corresponding polynomial in encoding each plaintext value in the form of two output parameters. The actual encoding scheme is explained further hereinbelow. In some embodiments, the server receives from the secure device, in addition to these two output parameters, additional parameters equal to the sum and product of the roots, and applies the sum and the product in computing the homomorphic exponentiation.

In some of the disclosed embodiments, the result of the modular exponentiation operation is a session key for use in encrypted communications between the device and a peer device. In such cases, the base of at least one of the modular exponentiation operations requested by the device typically comprises a public value that has been raised to a secret exponent held by the peer device.

As another example, when the Diffie-Hellman shared-key protocol is carried out in the conventional manner between peer devices of Alice and Bob, Alice's device passes to Bob's device a public value g raised to the power of Alice's secret, a, i.e., Alice's device passes the value of $g^a$ mod N to Bob's device. Bob's device who has its secret, b, passes to Alice's device the value $g^b$ mod N. Alice's device and Bob's device can each securely compute $g^{ab}$ for use as a shared session key by raising the value each received ($g^b$ or $g^a$, respectively) to Alice's or Bob's own secret power (a or b, respectively).

In another embodiment of the present disclosure, on the other hand, when Alice's device has weak computational capabilities, Alice's device can instead use the present homomorphic encryption scheme to encrypt and pass its secret value a securely to the server. Alice's device also passes the value of $g^a$ to Bob's device, along with certain "helping values" (as explained below). Bob's device passes its public value $g^b$ to the server, along with a homomorphically-encrypted interim result based on the values that Alice's device has provided. The server uses the values provided by Alice's device and Bob's device to homomorphically exponentiate $g^b$, and returns to Alice's device a pair of output values representing the session key $g^{ab}$, which Alice's device can efficiently and securely decrypt using the homomorphic decryption key known only to Alice's device. Alice's device and Bob's device can then encrypt and decrypt subsequent communications between them using the session key.

FIG. 1 is a schematic, pictorial illustration of a cryptographic system 20, in accordance with an embodiment of the present disclosure. In the pictured embodiment, an untrusted server 22 performs homomorphic exponentiation on behalf of a secure client device 24. The server in this example may be a general-purpose computer, comprising a processor 30 and a memory 26, with an interface 28 for communicating with device 24. Interface 28 is pictured as comprising a wireless antenna, but other types of wireless and/or wired links may be provided alternatively or additionally as channels for communicating with clients. The server may also comprise a display and/or other peripheral components.

Typically, server 22 performs the functions that are described herein under the control of software. This software may be downloaded to the server in electronic form, over a network, for example. Alternatively or additionally, the software may be held on tangible, non-transitory computer-readable media, such as optical, magnetic, and/or electronic memory components.

Client device 24 in this example comprises a smart card, comprising a processor 32, a memory 34, and a communication interface 36, and possibly other components such as a display 38. As in the case of interface 28, interface 36 is shown in the figure as comprising a wireless antenna, so that server 22 communicates with device 24 over a wireless communication channel. Alternatively, the communication channel between server 22 and device 24 may comprise any other suitable sort of wireless or wired link, including internal buses, such as, in certain embodiments, internal links within an apparatus or even in a single chip that contains both device 24 and processor 30.

Processor 32 is typically programmed in software or firmware, which may be stored in memory 34, to carry out the functions that are described herein. Alternatively or additionally, processor 32 may comprise dedicated hardware logic for carrying out at least some of these functions. In view of the computational simplicity of the cryptographic methods performed by device 24, however, as described hereinbelow, it is generally unnecessary that device 24 comprise dedicated cryptographic accelerator circuits, as in some devices that are known in the art.

In some embodiments of the present disclosure, device 24 makes use of the exponentiation support provided by server 22 in carrying out encrypted communications with a peer device 40. Device 40 typically comprises a general-purpose or dedicated computer, comprising a software-driven processor 42 and a memory 44, along with a user interface 46, if required, and a communication interface 48.

In such embodiments, device 24 may make use of the services of server 22 in computing a secret session key under a secure key-exchange protocol, such as the Diffie-Hellman protocol mentioned above. In this context, server 22 uses information provided both by device 24 and by peer device 40. For this purpose, device 40 may communicate directly with server 22, or it may convey the necessary information to device 24, which passes the information to the server. For enhanced security, device 24 may also delegate certain homomorphic computations to peer device 40, as explained further hereinbelow with reference to FIG. 3. In the described embodiment, the communication channels between server 22, device 24, and peer device 40 are typically not secure.

For the sake of clarity and convenience, embodiments of the present disclosure are described hereinbelow by way of example with reference to the elements of system 20. The principles of the present disclosure are by no means limited to this sort of system, however, and may alternatively be implemented in substantially any sort of cryptographic environment, including both client-server and peer-to-peer applications, and including substantially any and all sorts of computing and cryptographic devices. Specifically, although server 22 is shown in FIG. 1 as a distinct physical machine, the functions of server 22 in the present embodiments may be carried out by substantially any suitable sort of computing machine, ranging, for example, from a virtual machine running on a cloud computer or cluster, to an unsecure processor contained in the same physical enclosure as device 24.

Polynomial Homomorphic Exponentiation

The following description will relate to encryption and exponentiation of a single numerical variable v, using a second-order public polynomial PP(v). The computations are typically mod N, wherein N is a public modulus, which may be derived as the product of two secret primes, p and q, $N=p \cdot q$. Encryption schemes using higher-order polynomials may alternatively be used and are considered to be within the scope of the present disclosure. Further details are presented in the Annex. The Annex also describes a matrix based homomorphic method which may be used for homomorphic encryption and/or decryption as described herein.

To encrypt a secret value for exponentiation, Alice's device (device 24) selects two (mod N) secret, random, large numbers, $v_1$ and $v_2$, and computes the public polynomial:

$$PP(v)=(v-v_1) \cdot (v-v_2) \bmod N = v^2 + b \cdot v + c$$

The plaintext value $X_i$ can be encrypted using any linear function in the variable v of the form $a_i \cdot v + d_i$ satisfying $a_i \cdot v_1 + d_i = X_i$. The homomorphic encryption of $X_i$, $HE(X_i)$, is defined by the pair of parameters $(a_i, d_i)$. To encrypt $X_i$ in this fashion, Alice's device selects a large-number (mod N) random value $R_i$, sets $a_i = R_i$, and finds $d_i$ by solving the linear equation:

$$R_i \cdot v_1 + d_i = X_i, \text{ i.e., } d_i = X_i - R_i \cdot v_1.$$

Thus, the ciphertext of $X_i$ is the pair $(a_i, d_i)$.

To decrypt an encrypted variable (or a computed function of encrypted variables, as may be returned to Alice's device by server 22) that is represented by a pair (a,d), Alice's device need only compute the linear function $a \cdot v_1 + d$ using the secret root $v_1$.

Homomorphic multiplication of encrypted values of the form $HE(X_i) = (a_i, d_i)$ by server 22 requires that the server also receive from Alice's device and make use of the polynomial coefficients derived above:

$$b = -(v_1 + v_2) \equiv -T_v$$

$$c = v_1 \cdot v_2 \equiv P_v$$

Server 22 performs homomorphic multiplication of two encrypted values $HE(X_1)$ and $HE(X_2)$ by computing the following sum of products:

$$HE(X_1) \cdot HE(X_2) = ((a_1 + d_1)(a_2 + d_2) - a_1 \cdot a_2 \cdot (1+b) - d_1 \cdot d_2, (d_1 \cdot d_2 - a_1 \cdot a_2 \cdot c))$$

The above form utilizes five multiplications for each product computed. For squaring, the number of multiplications may be reduced to four using the following formula:

$$(HE(X_1))^2 = (a_1 \cdot (2d_1 - b \cdot a_1), (d_1 + \sqrt{c} \cdot a_1) \cdot (d_1 - \sqrt{c} \cdot a_1))$$

Server 22 performs homomorphic exponentiation of $HE(X_i)$ by repeated squaring and multiplication operations, using the values $a_i$ and $d_i$, along with other public "helping values," such as $T_v$ and $P_v$, that are provided by device 24. Considering the simplicity of the homomorphic encryption and decryption operations that are left for device 24 to perform, the computational load imposed on device 24 by an exponentiation of this sort with a large base and large exponent is typically reduced by over 98% when the exponentiation is offloaded to server 22, by comparison with internal exponentiation by device 24 itself.

Figure 2:
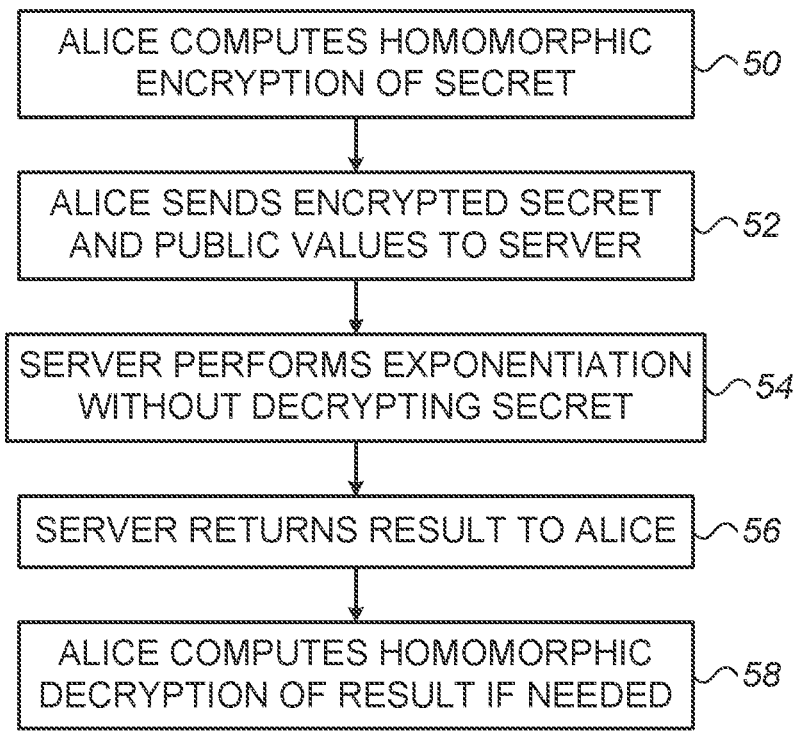
FIG. 2 is a flow chart that schematically illustrates a method for secure exponentiation using homomorphic encryption, in accordance with an embodiment of the present disclosure.

FIG. 2 is a flow chart that schematically illustrates a method for secure exponentiation using homomorphic encryption, in accordance with an embodiment of the present disclosure. The method will first be presented generally, followed by more specific descriptions of three possible use cases.

To initiate a server-assisted exponentiation, Alice's device (device 24) computes the homomorphic encryption of a secret value that is to be used in the operation, at an encryption step 50. The secret value S may be either the base or the exponent, as illustrated in the use cases that follow. The encryption of S is the pair of parameters $(a_S,d_S)$, as defined above, which is expressed for each specific S in terms of the parameter values $(R_S,U_S)$.

Alice's device sends an exponentiation request to server 24, at a request step 52. The request includes the encrypted secret $(R_S,U_S)$, along with certain public helping values that are required for the particular configuration of the request (depending, for example, on whether the base or the exponent is secret, and whether the exponentiation result will be returned in encrypted or plaintext form). The server performs the exponentiation, using homomorphic squaring and multiplication functions, at a computation step 54. Because the encryption is homomorphic, the server need not decrypt the secret value in order to perform the computation, nor is the server practically able to decrypt the secret value.

After completing the computation, server 24 returns the result to Alice's device, at a return step 56. As noted above, depending on the configuration of the request made at step 52, the result may be either plaintext or homomorphically encrypted. In the latter case, Alice's device applies homomorphic decryption to the pair of parameters returned by the server in order to recover the actual result, at a decryption step 58.

The following two use cases illustrate applications of the method of FIG. 2 in two configurations:

1. Secret Exponent S, Public Base g and Result $g^S$

For this computation, Alice's device provides the server with the pair of encryption parameters $HE(S)\equiv S^*=(Rs,Us)$, along with g and the preliminary exponentiation value $g^{v1}$. Assuming that both g and $v_1$ are known to Alice's device well in advance, Alice's device may precompute or otherwise receive the value of $g^{v1}$ securely, and may store it in memory 34 for subsequent use. Using the values provided by Alice's device, the server computes the product of two scalar exponentiations: $g^S = g^{Us}(g^{v1})^{Rs}$ mod N and returns the plaintext result to Alice's device. This sort of computation is useful, for example, in supporting DSA encryption, for which $g^k$ is computed with a secret k.

2. Public Base g, Secret Exponent S and Result $g^S$

To maintain security in this more challenging case, Alice's device uses two different polynomials for homomorphic encryption of different secret values: S is encrypted using a first polynomial with secret roots $(v_1,v_2)$, while the preliminary exponentiation value $g^{v1}$ is encrypted using a second polynomial with secret roots $(w_1,w_2)$. Encryption of S and $g^{v1}$ using the respective polynomials gives the results: $HE(S)\equiv S^*=(Rs,Us)$ and $HE(g^{v1})\equiv G^*=(R_G,U_G)$. Alice's device passes these pairs of parameters to the server, along with the public base g and the sum and product values Tw and Pw of the second polynomial.

The server uses the encryption parameters and helping values in computing the product of a scalar exponentiation and a homomorphic exponentiation $HE(g^S)=g^{Us}(G^*)^{Rs}$ mod N and returns the result to Alice's device. Alice's device uses the secret root $w_1$ to homomorphically decrypt $HE(g^S)$ and thus recover the secret result $g^S$.

The next section describes an application of the above principles in a three-way exchange of secret values, with secure exponentiation performed by two of the parties.

Server-Assisted Secure Key Exchange

Figure 3:
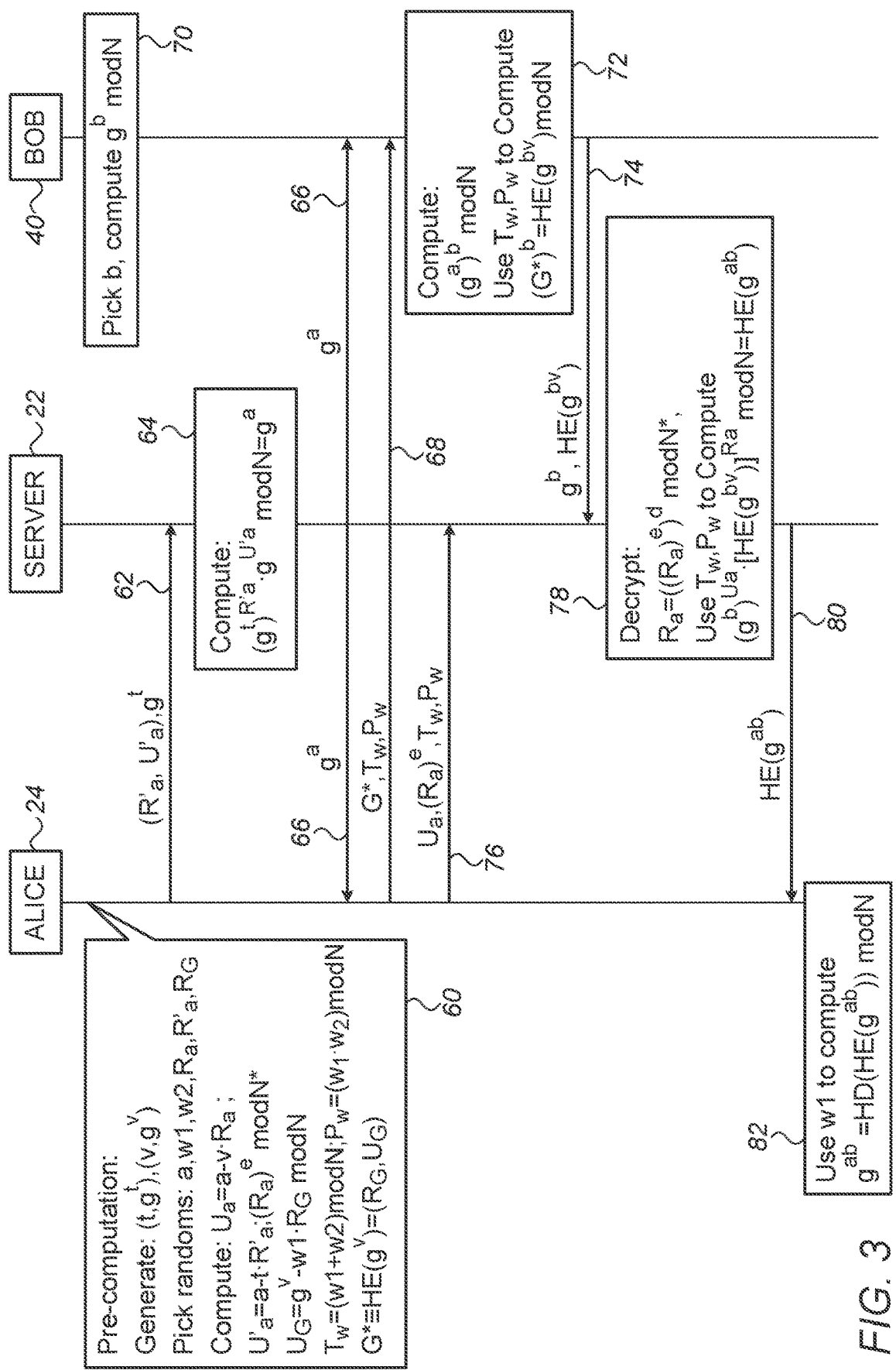
FIG. 3 is a communication flow diagram that schematically illustrates a method for cryptographic key exchange using homomorphic encryption, in accordance with an embodiment of the present disclosure.

FIG. 3 is a communication flow diagram that schematically illustrates a method for cryptographic key exchange using, in part, homomorphic encryption, in accordance with an embodiment of the present disclosure. As in the case of the preceding embodiments, the method will be described, for the sake of convenience and clarity, with reference to the elements of system 20, referring to device 24 alternatively as "Alice," or "Alice's device" and peer device 40 as "Bob" or "Bob's device." Device 40 is assumed to be a trusted device with sufficient computing power to perform its own part in the key exchange protocol without assistance. Device 24 is assisted in performing exponentiation by untrusted server 22, and may also delegate certain homomorphic computations to peer device 40, as described below. Server 22 in this case is "untrusted" in the sense that the server assists device 24 in exponentiation without receiving the actual secret exponent, although the server may still be trusted to receive and hold certain encryption parameters in confidence, as explained below. The homomorphic computations performed by Bob's device are important in supporting the role played by the server in exponentiation assistance.

The description below relates, for the sake of concreteness, to a particular implementation of the Diffie-Hellman key exchange protocol. The principles of server-assisted key exchange that are described herein (and more generally, the principles of server-assisted exponentiation), however, are not limited to this particular implementation, protocol, or system environment. In addition, although the method is described hereinbelow in terms of certain steps performed sequentially, in practice at least some of these steps may be performed concurrently or in a different sequential order. Furthermore, although the computational tasks in the present description are distributed among the parties (Alice's device, Bob's device, and the server) in a certain way, the techniques of server-aided exponentiation that are described above may be applied in other ways to support Diffie-Hellman and other key-exchange protocols. All of these alternative system and method implementations of the present principles are considered to be within the scope of the present disclosure To begin the key exchange process of FIG. 3, Alice's device chooses and/or precomputes a number of secret values to be used in the protocol, at a pre-computation step 60. At this step, Alice's device pre-computes two key pairs: $(t, g^t)$ and $(v, g^v)$, wherein g is the public base and t and v are secrets. Techniques that may be used to perform this pre-computation securely, but with minimal expenditure of computation resources, are described hereinbelow with reference to FIG. 4. In addition, Alice's device chooses a number of large random values for use in the subsequent computations, including the secret exponent a, a pair of secret roots $(w_1,w_2)$, and encryption parameters $R_a$, $R'_a$, and $R_G$. Alice's device uses these parameters in a number of simple preparatory computations, including the following:

Alice's device uses $R_a$ and v to encrypt a, giving the encryption parameters $(R_a,U_a)$, wherein $U_a=a-vR$.

Similarly, Alice's device uses $R'_a$ and t to perform another encryption of a, giving the encryption parameters $(R'_a, U'_a)$, wherein $U'_a=a-tR'_a$.

Alice's device uses $R_G$ and the secret roots $(w_1, w_2)$ to homomorphically encrypt the key value $g^v$, giving the parameters of $HE(g^v) \equiv G^* = (R_G, U_G)$, wherein $U_G = g^v - w_1 R_G$.

Alice's device computes the public helping values $T_w = w_1 + w_2$ and $P_w = w_1 \cdot w_2$.

Alice's device encrypts the parameter Ra using the public key e of server 22 in an asymmetric encryption algorithm, such as RSA, to give the encrypted value $Ra^* = (Ra^e) \mod N^*$. Here $N^*$ is a large public modulus, while e has a small value to enable Alice's device to perform the computation quickly, for example e=3.

The variables in the above formulation may be of any suitable size. For example, in a typical implementation, a, N and $N^*$ are 1024 bit numbers; v and t are each 160 bits; and $R_a$ and $R'_a$ are each (N−160) bits. $R_G$, $w_1$ and $w_2$ are in $Z_N$.

Alice's device transmits the pair of encryption parameters $(R'_a, U'_a)$ and the key value $g^t$ to server 22, at an initial transmission step 62. Server 22 uses these values in computing Alice's public key $g^a$ for purposes of the key exchange protocol, at a public key computation step 64:

$$g^a = (g^t)^{R'_a} \cdot g^{U'_a} \mod N$$

Server 22 transmits the value $g^a$ to both Alice's device and Bob's device, at a public key transmission step 66. Alternatively, server 22 may transmit the value $g^a$ to Alice's device, and Alice's device then transmits it to Bob's device. For purposes of the protocol, Alice's device also transmits the parameters of $G^*$ to Bob's device, along with the helping sum and product values $T_w$ and $P_w$ (as defined above), at a peer transmission step 68.

Bob's device chooses its own secret exponent b, and uses this value together with the public base g and modulus N to compute the public key $g^b \mod N$, at a peer pre-computation step 70. Bob's device uses the parameters received in steps 66 and 68 to compute the homomorphic exponentiation $(G^*)^b \mod N$, as well as the secret session key $g^{ab} \mod N$, at a peer computation step 72. In cryptographic terms, $(G^*)^b \mod N = HE(g^{bv})$. Bob's device returns the public values $g^b$ and $(G^*)^b \mod N$ to server 22, at a parameter return step 74. Alternatively, Bob's device may pass these values directly to Alice's device, who then forwards them to server 22. For the purposes of the next computation by server 22, Alice's device also passes the encryption parameters $R_a^*$ (i.e., the RSA-encrypted value of $R_a$) and $U_a$ and the helping values $T_w$ and $P_w$ to the server, at a supplemental transmission step 76.

Server 22 uses these values to perform the exponentiation operations needed to compute the homomorphic encryption of the secret session key, $HE(g^{ab})$, at an exponentiation step 78. For this purpose, the server first decrypts the value $R_a^*$ to recover the original encryption parameter $R_a = (R_a^e)^d \mod N^*$, using the server's private RSA key d. As noted earlier, e and $N^*$ are the public key and modulus, respectively, of the server. Server 22 then uses the helping values received at step 76 to compute $HE(g^{ab})$ as follows by homomorphic exponentiation, using the parameters $R_a$ and $U_a$ and the public value $g^b$, without access to or decryption of any of the secret values involved:

$$HE(g^{ab}) = (g^b)^{U_a} \cdot [HE(g^{bv})]^{R_a} \mod N$$

Server 22 conveys this result, which comprises the pair of parameters that homomorphically encrypt the secret session key, $g^{ab}$, back to Alice's device, at a result transmission step 80. Alice's device then applies the simple arithmetic operations of polynomial homomorphic decryption, as described above, to recover the session key: $HD(HE(g^{ab})) \mod N = g^{ab}$, at a key recovery step 82. Alice's device and Bob's device are now able to encrypt and decrypt communications between them using this session key, generally without requiring further assistance from the server.

Figure 4:
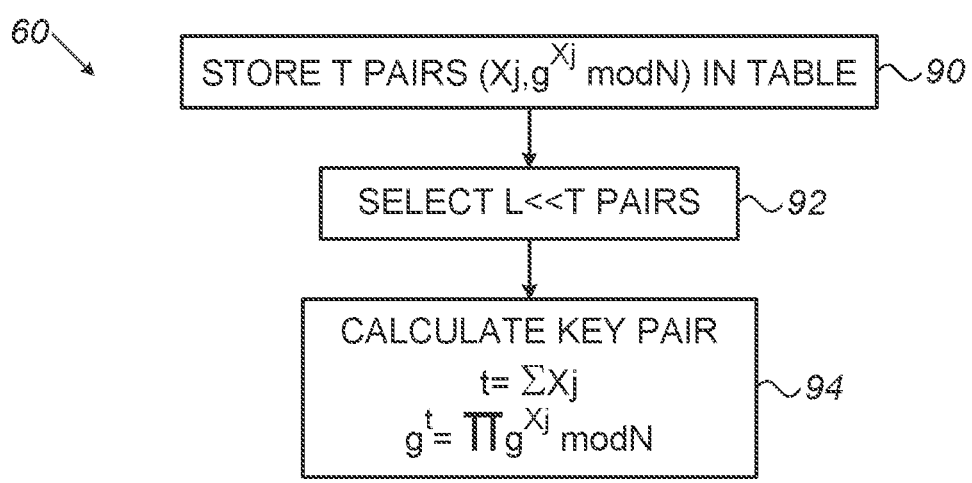
FIG. 4 is a flow chart that schematically illustrates a method for key pair computation, in accordance with an embodiment of the disclosure.

FIG. 4 is a flow chart that schematically illustrates a method for key pair computation, which can be used by device 24 (Alice's device) in performing the pre-computation functions included in the pre-computation step 60, in accordance with an embodiment of the disclosure. For the purposes of pre-computation step 60, the values of $g^t$ and $g^v$, corresponding to the value g raised to the secret exponents t and v, respectively, may be pre-computed offline and stored by Alice's device for subsequent use. Alternatively, to provide Alice's device with a large choice of values of t and v while avoiding the need for full on-line computation of $g^t$ and $g^v$, Alice's device may acquire the values of x and $g^x$ (x=t or v) for each key exchange using pre-computed table containing T pairs of component values of the form $(X_j, g^{X_j} \mod N)$, which are stored in memory 34 of device 24 in a table storage step 90. For example, the table may contain 256 pairs of values, in which the exponent $X_j$ in each pair is approximately 160 bits long.

To compute the key pair $(x, g^x)$, Alice's device randomly selects a set of L indices, $j_1, j_2, \ldots j_L$ (for example, with L=11), at a pair selection step 92. The number of indices is small compared to the number of pairs in the table. Using the selected L pairs of component values $(X_j, g^{X_j} \mod N)$, Alice's device then computes t and $g^t$ as follows, at a key pair selection step 94:

$$t = \sum_{k=1}^{L} x_{j_k} \mod N, \quad g^t = \prod_{k=1}^{L} g^{x_{j_k}} \mod N.$$

The secret values v and $g^v$ are similarly computed from the table using another set of L random values of $j_1, j_2, \ldots j_L$, to give:

$$g^v = \prod_{k=1}^{L} g^{x_{j_k}} \mod N, \quad v = \sum_{k=1}^{L} x_{j_k} \mod N.$$

If Alice's device does not have sufficient secure internal memory to store the table of T pairs of component values, the table may be encrypted and stored externally, and then streamed to Alice's device for random selection of L pairs when needed. Alternatively, other methods may be used in generating the above values securely, such as the methods described by de Rooij, in "Efficient Exponentiation Using Precomputation and Vector Addition Chains," *Advances in Cryptology—EUROCRYPT '94* (Lecture Notes in Computer Science 950, Springer-Verlag, 1995), pages 389-399.

Although the method of FIG. 4 is described above in the specific context of Diffie-Hellman key exchange, the use of pre-stored pairs of component values of the form $(X_j, g^{X_j} \mod N)$ in generating a large secret value and its exponent by summation and multiplication, as described above, is by no means limited to this specific context. Rather, this technique can be applied in other settings in which a device with weak computational capabilities is required to generate a large secret value and its exponent, such as in the methods for secure exponentiation that are described above with reference to FIG. 2.

It is appreciated that software components may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It will be appreciated that various features of the disclosure which are, for clarity, described in the contexts of separate embodiments may also be provided in combination in a single embodiment. Conversely, various features of the disclosure which are, for brevity, described in the context of a single embodiment may also be provided separately or in any suitable sub-combination.

It will be appreciated by persons skilled in the art that the present disclosure is not limited by what has been particularly shown and described hereinabove. Rather the scope of the disclosure is defined by the appended claims and equivalents thereof.

Annex

The Methods: Practical FSERFS Simplified (Single Input)

Each of the isomorphic methods presented is an efficient non-deterministic Fully-homomorphic Symmetric Encryption and Randomization Function (FSERF). The input or message, IN, is comprised of k elements in a commutative ring (CR) or in ring $Z_N$. Randomization is defined over a general commutative ring (CR), e.g., F256, R (real numbers), or sub ring of commutative matrices. Encryption is defined over the ring $Z_N$ (the operations are typically mod N, where N is a product of two (large secret) primes). The non-deterministic method operates on an input and a random parameter (in $Z_N$ or CR); the random parameter typically changes per each execution of the method. For encryption both the plaintext input and the random parameter associated with it are random large-numbers in $Z_N$.

Two fundamental isomorphic methods are defined below; each randomizes or encrypts a single input element $X_i$. The basic (isomorphic) methods are a matrix-based method, MORE (Matrix Operation for Randomization or Encryption), and a polynomial-based method, PORE (Polynomial Operation for Randomization or Encryption). Additionally, 'compound' methods can be constructed by successively applying the basic methods.

The Matrix Method, More

Symmetric-Key Generation: Alice's device randomly selects a secret 2×2 invertible matrix, S, in $Z_N$ to be the symmetric key for encryption.

Encryption: For each plaintext input element $X_i$ Alice's device selects a random large-number $Y_i$, in $Z_N$. $X_i$ and $Y_i$ are placed in order on the diagonal of a 2×2 diagonal matrix. We denote MORE's output matrix as Ai and define the encryption of $X_i$ as:

$$\text{MORE}(X_i) = A_i = S\begin{pmatrix} X_i & 0 \\ 0 & Y_i \end{pmatrix} S^{-1} = \begin{pmatrix} a_{11} & a_{12} \\ a_{21} & a_{22} \end{pmatrix}$$

The cipher text of $X_i$ can be regarded as the four values given in matrix Ai. However an alternative economical representation is possible. For a given S, MORE's matrix space is defined by two large numbers, and the cipher text of a $X_i$ is defined by any pair of large numbers in $A_i$ except for $a_{12}$, $a_{21}$.

Decryption: One who knows S can decrypt the cipher text matrix A and recover a plaintext X. S and $S^{-1}$ are eliminated by simple matrix multiplication, $X=(S^{-1}AS)_{11}$.

Alternatively, let the vector (1, e) be an eigenvector of the matrix $$A = S\begin{pmatrix} X & 0 \\ 0 & Y \end{pmatrix} S^{-1}$$

satisfying: $(1, e)A=(X, e \cdot X)$.

The decryption of A is defined as follows:

$X = a_{11} + e \cdot a_{21} (\text{Mod } N)$ where $e=(-S_{12}/S_{22})$ mod N, and $S_{ij}$, $a_{ij}$ a are the ij elements of matrices S and A, respectively.

Computation of Multivariate Function of Encrypted Values

We define below the operations of addition, multiplication and division of encrypted values. We let A1 and A2 be the encrypted values of $X_1$ and $X_2$, respectively. The Ai's comprise the input of a function in which they are added, multiplied, or divided. We thus have for:

Addition, $\text{MORE}(X_1) + \text{MORE}(X_2) = A_1 + A_2$; and

Multiplication, $\text{MORE}(X_1) \cdot \text{MORE}(X_2) = A_1 \cdot A_2$; and

Division (for Det MORE(X2)≠0)

$1/\text{MORE}(X_2) = A_2^{-1}$ and $\text{MORE}(X_1)/\text{MORE}(X_2) = A_1 \cdot A_2^{-1}$;

It can be easily shown that under the above definitions MORE is fully homomorphic.

The Polynomial Method, Pore

Again, the simplest yet useful case to consider is a single variable encryption with the minimum degree of the public polynomial.

Symmetric-Key Generation: Alice's device selects two (mod N) secret random large-numbers, $v_1$ and $v_2$, for the symmetric-key. Alice's device computes the public polynomial $PP(v)=(v-v_1) \cdot (v-v_2)$ mod $N=v^2+b \cdot v+c$.

Encryption: Encryption of plain text $X_i$, Enc (Xi), is any linear function in variable v of the form $a_i \cdot v + d_i$ satisfying $a_i \cdot v_1 + d_i = X_i$. Let the pair $(a_i, d_i)$ define Enc (Xi). Alice's device selects a large-number mod N random $R_i$, for $a_i$ and solves the linear equation $R_i \cdot v_1 + d_i = X_i$ for $d_i$; thus $d_i = X_i - R_i \cdot v_1$. The cipher text of Xi, consists of the pair $(a_i, d_i)$. Alternatively, Alice's device can pick a random large-number mod N, $R_i$, for the given $X_i$ and solve the simultaneous equations below for the unknowns $a_i$ and $d_i$:

a. $a_i \cdot v_1 + d_i = X_i$, and b. $a_i \cdot v_2 + d_i = R_i$ resulting in: $a_i = (X_i - R_i)/(v_1 - v_2)$, and $d_i = X_i - a_i \cdot v_1 = (R_i \cdot v_1 - X_i \cdot v_2)/(v_1 - v_2)$.

This alternative, (computationally heavier), is useful in certain applications of verification.

Decryption: Given that an encrypted variable, (or a computed function of encrypted variables) is represented by a pair (a,d), anyone who knows the secret roots can decrypt by simply computing $a \cdot v_1 + d$.

Computation of multivariate function: For Bob's device to compute a function with the encrypted $X_i$, the public coefficients, b and c, (defined above under key generation) are used; note that b and c do not change for encryption of different variables; they are given typically once (per some predefined period) by Alice's device to Bob's device. We also note that typically one large-number multiplication is used for encryption. When computing multivariate functions with the encrypted variables we consider the addition, multiplication and division of two variables. Addition and multiplication of encrypted values are defined by the addition and multiplication, respectively, of the corresponding linear functions in $Z_N[v]/PP(v)$. Given $PORE(X_1)=(a_1,d_1)$, $PORE(X_2)=(a_2,d_2)$ and $PP(v)=v^2+bv+c$, addition, multiplication and division are performed as below.

Addition: $PORE(X_1)+PORE(X_2)=(a_1+a_2,d_1+d_2)$.

Adding a scalar $S$ to $PORE(X_1)$: $S+PORE(X_1)=(a_1,d_1+S)$.

Multiplication: $PORE(X_1) \cdot PORE(X_2)=((a_1+d_1)\cdot(a_2+d_2)-a_1 \cdot a_2 \cdot (1+b)-d_1 \cdot d_2, (d_1 \cdot d_2 - a_1 \cdot a_2 \cdot c))$.

This particular form aims at minimizing the number of multiplications of large numbers, i.e. five. Note, for squaring a variable, use above with $X_1=X_2$ and $(a_1=a_2, d_1=d_2)$. Multiplying $PORE(X_1)$ by a scalar $S$: $S \cdot PORE(X_1)=(S \cdot a_1, S \cdot d_1)$ Division: Let $D=d_2 \cdot (a_2 \cdot b - d_2) - (c \cdot a_2) \cdot a_2$, $PORE(X_1)/PORE(X_2)=((a_2 \cdot d_1 - a_1 \cdot d_2)/D, (d_1 \cdot (a_2 \cdot b - d_2) - (c \cdot a_2) \cdot a_1)/D)$.

It can be shown easily that, under the above definitions, the PORE scheme is fully homomorphic.

More and Pore are Isomorphic

Given the above definitions of MORE and PORE where operations under MORE are over the commutative ring $C1=\{SMS^{-1}|M$ a diagonal matrix comprised of X and Y$\}$, and operations under PORE are in the commutative ring $C2=Z_N[v] \mod PP(v)$, it can be shown that: 1. The mapping $T: C1 \rightarrow C2$ defined by $T(SMS^{-1})=av+d$ where $av_1+d=X$ and $av_2+d=Y$ is an isomorphism; and 2. For a given element in C1 finding its isomorphic image by someone who knows $PP(v)$ is as difficult as factoring N.

What is claimed is:

1. An apparatus comprising:
   a communication interface, which is configured to receive, over a communication channel from a device external to the apparatus:
      a request to perform a modular exponentiation operation in which an exponent of the modular exponentiation operation comprises a secret value, wherein the secret value is not provided to the apparatus;
      at least two parameters that encode the secret value in accordance with a polynomial homomorphic encryption of the secret value computed by the device; and
      a sum and a product of polynomial roots; and
   a processor, which is configured to perform, in response to the request, a homomorphic exponentiation using the at least two parameters received from the device without decrypting the secret value in the apparatus, and to apply the sum and the product in computing the homomorphic exponentiation, so as to generate an output that is indicative of a result of the modular exponentiation operation, wherein the result of the modular exponentiation operation includes a session key used in encrypted communications between the device and a peer device.

2. The apparatus of claim 1, wherein the output comprises the result of the modular exponentiation operation in plaintext.

3. The apparatus of claim 1, wherein the output comprises a pair of output values, the pair of output values being decrypted by the device using a polynomial homomorphic decryption to recover the result of the modular exponentiation operation.

4. The apparatus of claim 3, wherein the polynomial homomorphic encryption uses two secret random large numbers as the polynomial roots in computing the at least two parameters.

5. The apparatus of claim 3, wherein a base of the modular exponentiation operation requested by the device comprises a public value raised to the exponent.

6. The apparatus of claim 3, wherein the processor is configured to compute a key pair $(x, g^x)$, wherein x is the secret value, by storing a plurality of pairs of component values $(X_j, g^{X_j} \mod N)$, selecting a subset of the pairs, and computing x as a sum of the values $X_j$ over the subset, and $g^x$ as a product of the values $g^{X_j} \mod N$ over the subset.

7. The apparatus of claim 1, wherein the processor is configured to compute a key pair $(x, g^x)$, wherein x is the secret value, by storing a plurality of pairs of component values $(X_j, g^{X_j} \mod/N)$, selecting a subset of the pairs, and computing x as a sum of the values $X_j$ over the subset, and $g^x$ as a product of the values $g^{X_j} \mod N$ over the subset.

8. A method comprising:
   receiving at a first device over a communication channel from a second device, a request to perform a modular exponentiation operation in which an exponent of the modular exponentiation operation comprises a secret value, wherein the secret value is not provided to the first device;
   receiving at the first device at least two parameters that encode the secret value in accordance with a polynomial homomorphic encryption of the secret value computed by the second device and a sum and a product of polynomial roots; and
   computing at the first device, in response to the request, a homomorphic exponentiation using the at least two parameters received from the second device without decrypting the secret value in the first device, including applying the sum and the product in computing the homomorphic exponentiation, so as to generate an output that is indicative of a result of the modular exponentiation operation, wherein the result of the modular exponentiation operation is a session key used in encrypted communications between the second device and a peer device.

9. The method of claim 8, wherein the output comprises the result of the modular exponentiation operation in plaintext.

10. The method of claim 8, wherein the output comprises a pair of output values, the pair of output values being decrypted by the second device using a polynomial homomorphic decryption to recover the result of the modular exponentiation operation.

11. The method of claim 10, wherein the polynomial homomorphic encryption uses two secret random large numbers as the polynomial roots in computing the at least two parameters.

12. The method of claim 10, wherein a base of the modular exponentiation operation requested by the second device comprises a public value raised to the exponent.

13. The method of claim 10, wherein computing comprises computing a key pair $(x, g^x)$, wherein x is the secret value, by storing a plurality of pairs of component values $(X_j, g^{X_j} \bmod/N)$, selecting a subset of the pairs, and computing x as a sum of the values $X_j$ over the subset, and $g^x$ as a product of the values $g^{X_j} \bmod N$ over the subset.

14. The method of claim 8, computing comprises computing a key pair $(x, g^x)$, wherein x is the secret value, by storing a plurality of pairs of component values $(X_j, g^{X_j} \bmod/N)$, selecting a subset of the pairs, and computing x as a sum of the values $X_j$ over the subset, and $g^x$ as a product of the values $g^{X_j} \bmod/N$ over the subset.

15. A non-transitory computer readable storage media storing instructions that, when executed by a processor of a first device, cause the processor to perform operations including:

receiving at the first device over a communication channel from a second device, a request to perform a modular exponentiation operation in which an exponent of the modular exponentiation operation comprises a secret value, wherein the secret value is not provided to the first device;

receiving at the first device at least two parameters that encode the secret value in accordance with a polynomial homomorphic encryption of the secret value computed by the second device and a sum and a product of polynomial roots; and computing at the first device, in response to the request, a homomorphic exponentiation using the at least two parameters received from the second device without decrypting the secret value in the first device, including applying the sum and the product in computing the homomorphic exponentiation, so as to generate an output that is indicative of a result of the modular exponentiation operation, wherein the result of the modular exponentiation operation is a session key used in encrypted communications between the second device and a peer device.

16. The computer readable storage media of claim 15, wherein the output comprises the result of the modular exponentiation operation in plaintext.

17. The computer readable storage media of claim 15, wherein the output comprises a pair of output values, the pair of output values being decrypted by the second device using a polynomial homomorphic decryption to recover the result of the modular exponentiation operation.

18. The computer readable storage media of claim 15, wherein the polynomial homomorphic encryption uses two secret random large numbers as the polynomial roots in computing the at least two parameters.

19. The computer readable storage media of claim 15, wherein a base of the modular exponentiation operation requested by the second device comprises a public value raised to the exponent.

20. The computer readable storage media of claim 15, wherein the instructions operable for computing include instructions for computing a key pair $(x, g^x)$, wherein x is the secret value, by storing a plurality of pairs of component values $(X_j, g^{X_j} \bmod/N)$, selecting a subset of the pairs, and computing x as a sum of the values $X_j$ over the subset, and $g^x$ as a product of the values $g^{X_j} \bmod/N$ over the subset.

* * * * *